United States Patent
Qattum et al.

(10) Patent No.: US 12,424,928 B2
(45) Date of Patent: Sep. 23, 2025

(54) RESISTOR-LESS PRE-CHARGING TECHNIQUES

(71) Applicant: Caterpillar Inc., Peoria, IL (US)

(72) Inventors: Basheer Qattum, Peoria, IL (US); Dachuan Yu, Dunlap, IL (US)

(73) Assignee: Caterpillar Inc., Peoria, IL (US)

( * ) Notice: Subject to any disclaimer, the term of this patent is extended or adjusted under 35 U.S.C. 154(b) by 258 days.

(21) Appl. No.: 18/134,099

(22) Filed: Apr. 13, 2023

(65) Prior Publication Data
US 2024/0348154 A1   Oct. 17, 2024

(51) Int. Cl.
 *H02M 1/36* (2007.01)
 *H02M 1/32* (2007.01)

(52) U.S. Cl.
 CPC .............. *H02M 1/32* (2013.01); *H02M 1/36* (2013.01)

(58) Field of Classification Search
 CPC ................................. H02M 1/36; H02M 1/32
 See application file for complete search history.

(56) References Cited

U.S. PATENT DOCUMENTS

| | | | | |
|---|---|---|---|---|
| 5,122,724 | A * | 6/1992 | Criss ...................... | H02M 7/062 361/111 |
| 5,483,142 | A | 1/1996 | Skibinski et al. | |
| 6,654,262 | B2 | 11/2003 | Hussein et al. | |
| 10,230,298 | B2 | 3/2019 | Hufnagel et al. | |
| 11,400,831 | B1 | 8/2022 | Wand et al. | |
| 2006/0031406 | A1 | 2/2006 | Watson et al. | |
| 2011/0038185 | A1 * | 2/2011 | Swamy ..................... | H02J 7/04 363/95 |
| 2015/0229203 | A1 | 8/2015 | Esmaili et al. | |
| 2015/0364939 | A1 * | 12/2015 | Talja ....................... | H02J 7/345 320/166 |
| 2022/0402390 | A1 * | 12/2022 | Smolenaers ............ | H02J 3/322 |

FOREIGN PATENT DOCUMENTS

| | | |
|---|---|---|
| DE | 102018203388 | 9/2019 |
| JP | 2020120552 | 8/2020 |
| JP | 2021164286 | 10/2021 |
| KR | 101146005 | 5/2012 |

OTHER PUBLICATIONS

Gomes Camilo C et al: "Damping techniques for grid-connected voltage source converters based on LCL filter: An overview", Renewable and Sustainable Energy Reviews, vol. 81, Dec. 31, 2017 (Dec. 31, 2017), pp. 116-135, XP085286415, ISSN: 1364-0321, DOI: 10.1016/J.RSER.2017.07.050.

Maghraby Mohamed et al: "Analysis and implementation of discrete SPWM signals for grid-connected inverter with LCL filter", 2017 Nineteenth International Middle East Power Systems Conference {MEPCON), IEEE, Dec. 19, 2017 {Dec. 19, 2017), pp. 515-520, XP033325966, DOI: 10.1109/MEPCON.2017.8301229 [retrieved on Feb. 22, 2018].

Written Opinion and International Search Report for Int'l. Patent Appln. No. PCT/US2024/018291, mailed Jul. 18, 2024 (15 pgs).

* cited by examiner

*Primary Examiner* — Harry R Behm
(74) *Attorney, Agent, or Firm* — Schwegman

(57) ABSTRACT

Techniques that eliminate the need for a dedicated pre-charge resistor by using the main power path of the AC/DC, DC/DC, or DC/AC converter. By eliminating the pre-charge resistor, the techniques increase the maximum allowable current rating of the converter as well as increase the impedance and inductance of the converter.

20 Claims, 5 Drawing Sheets

RESISTOR-LESS PRE-CHARGING TECHNIQUES

TECHNICAL FIELD

This document relates generally to power conversion and, in particular, to techniques for limiting inrush current.

BACKGROUND

Prior to starting the switching operation used in DC/AC, DC/DC or AC/DC converters, the capacitors in the converter are at a near zero voltage. If the switching is initiated without first pre-charging the capacitors, there can be a very large inrush current. The inrush current can be several times the normal operating current and can damage components within the current path. Conventional approaches to solve the inrush current issue involve placing a pre-charge resistor in the current path to reduce the magnitude. However, the pre-charge resistor introduces a lossy element that consumes power during normal operation.

U.S. Pat. No. 10,230,298 discloses a boost PFC converter includes a rectifier, a converter and an output stage comprising an output capacitor where the DC output voltage is provided across the output capacitor. The rectifier includes four rectifying elements connected in a full bridge configuration where the upper two of these four rectifying elements are thyristors and where the lower two are diodes. In that the thyristors are controlled such as to be open for only a part of each half period of the input voltage, the amount of current per half period that is passed to the output capacitor is controllable and can be made very small. Accordingly, the charge current for pre-charging the output capacitor can be controllably limited such that a bulky pre-charge resistor is not required anymore to avoid high inrush currents.

SUMMARY

This disclosure describes techniques that eliminate the need for a dedicated pre-charge resistor by using the main power path of the AC/DC, DC/DC, or DC/AC converter. By eliminating the pre-charge resistor, the techniques of this disclosure increase the maximum allowable current rating of the converter as well as increase the impedance and inductance of the converter.

In an aspect, this disclosure is directed to a power conversion circuit configured to limit inrush current during startup without using resistors, the power conversion circuit comprising: a first terminal configured to couple to an energy storage device: a converter circuit coupled to the first terminal, the converter circuit including an electronic switch and a protection diode coupled across the electronic switch; a switch circuit configured to couple to an AC voltage: a second terminal coupled to the switch circuit: a filter circuit coupled between the converter circuit and the second terminal and configured to filter the AC voltage, the filter circuit including: a first inductor coupled to the converter circuit; and a capacitor coupled between the first inductor and the second terminal; and a protection inductor coupled to the first terminal or the second terminal, wherein the protection inductor is configured to saturate at a current less than a current rating of the protection diode to limit inrush current during startup without using resistors.

In another aspect, this disclosure is directed to a method of limiting inrush current to a power conversion circuit during startup without using resistors, the method comprising: coupling a first terminal of the power conversion circuit to an energy storage device: coupling the first terminal to a converter circuit, wherein the converter circuit includes an electronic switch and a protection diode coupled across the electronic switch: coupling a switch circuit to an AC voltage: coupling a second terminal to the switch circuit: coupling a filter circuit between the converter circuit and the second terminal, wherein the filter circuit is configured to filter the AC voltage; and saturating a protection inductor coupled to the first terminal or the second terminal at a current less than a current rating of the protection diode to limit inrush current during startup without using resistors.

In yet another aspect, this disclosure is directed to a power conversion circuit configured to limit inrush current during startup without using resistors, the power conversion circuit comprising: a first terminal configured to couple to an energy storage device: a converter circuit coupled to the first terminal, the converter circuit including an electronic switch and a protection diode coupled across the electronic switch: a switch circuit configured to couple to an AC voltage: a second terminal coupled to the switch circuit; a filter circuit coupled between the converter circuit and the second terminal and configured to filter the AC voltage, the filter circuit including: a first inductor coupled to the converter circuit; and a capacitor coupled between the first inductor and the second terminal; and a 3-phase protection inductor coupled to the second terminal, wherein the 3-phase protection inductor is configured to saturate at a current less than a current rating of the protection diode to limit inrush current during startup without using resistors.

DETAILED DESCRIPTION

Conventional approaches to solve the inrush current issue in DC/AC, DC/DC or AC/DC converters involve placing a pre-charge resistor in the current path to reduce the magnitude. However, the pre-charge resistor introduces a lossy element that consumes power during normal operation.

This disclosure describes techniques that eliminate the need for a dedicated pre-charge resistor by using the main power path of the AC/DC, DC/DC, or DC/AC converter. By eliminating the pre-charge resistor, the techniques of this disclosure increase the maximum allowable current rating of the converter as well as increase the impedance and inductance of the converter.

Figure 1:
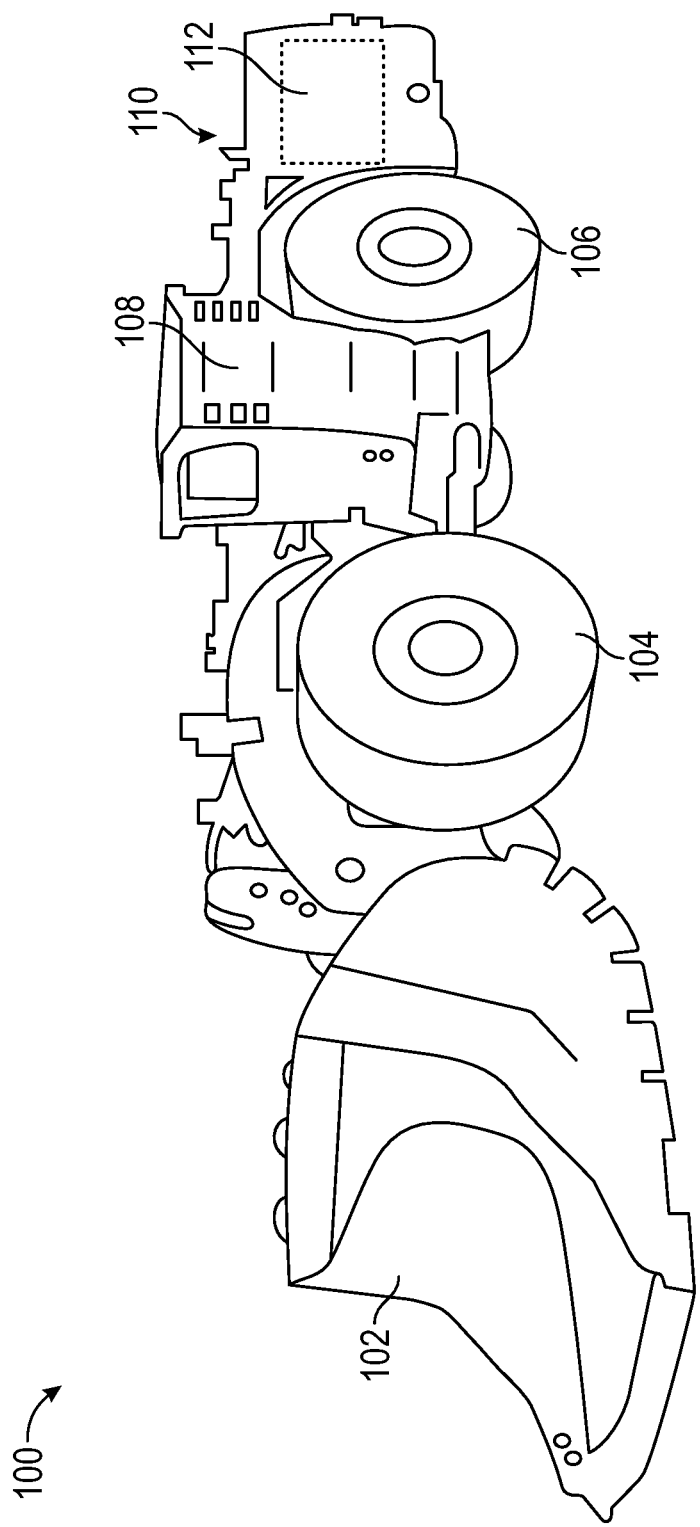
FIG. 1 is a perspective view of an example of a battery powered machine that can implement various techniques of this disclosure.

FIG. 1 is a perspective view of an example of a battery powered machine 100 that can implement various techniques of this disclosure. FIG. 1 depicts a non-limiting view of a battery powered machine 100 in the form of a load-haul-dump (LHD) vehicle, such as for mining, including a dump bucket 102, wheels 104, 106, an operator control cabin 108, and a vehicle body 110.

The battery powered machine 100, e.g., an electric mine truck, also includes an electrical architecture 112. The electrical architecture 112 can include a DC power source, including but not limited to a battery module, which can supply power to, among other things, an electric motor. The electric motor can supply rotational power to one or more systems, such as a system configured to operate various hydraulics of the dump bucket 102.

The techniques of this disclosure can be used by a power conversion circuit coupled between a DC power source, such as the DC power source (e.g., a battery module) of the electrical architecture 112 of the battery powered machine 100 of FIG. 1, and an external component, such as a grid (e.g., an electrical grid or a microgrid), motor, or generator. The techniques are applicable to DC power sources, such as battery modules, generally and not limited to those associated with battery powered machines. In addition, the techniques of this disclosure are not limited to LHD vehicles and are instead applicable to other industrial vehicles including, but not limited to, continuous miners, feeder breakers, roof bolters, utility vehicles for mining, underground mining loaders, underground articulated trucks, or any other vehicle used for industrial purposes, such as hauling, excavating, drilling, loading, dumping, compacting, etc. Further, the techniques of this disclosure, while especially suited to use in battery-powered vehicles, also could be used in hybrid-powered vehicles, and internal-combustion-powered vehicles.

Figure 2:
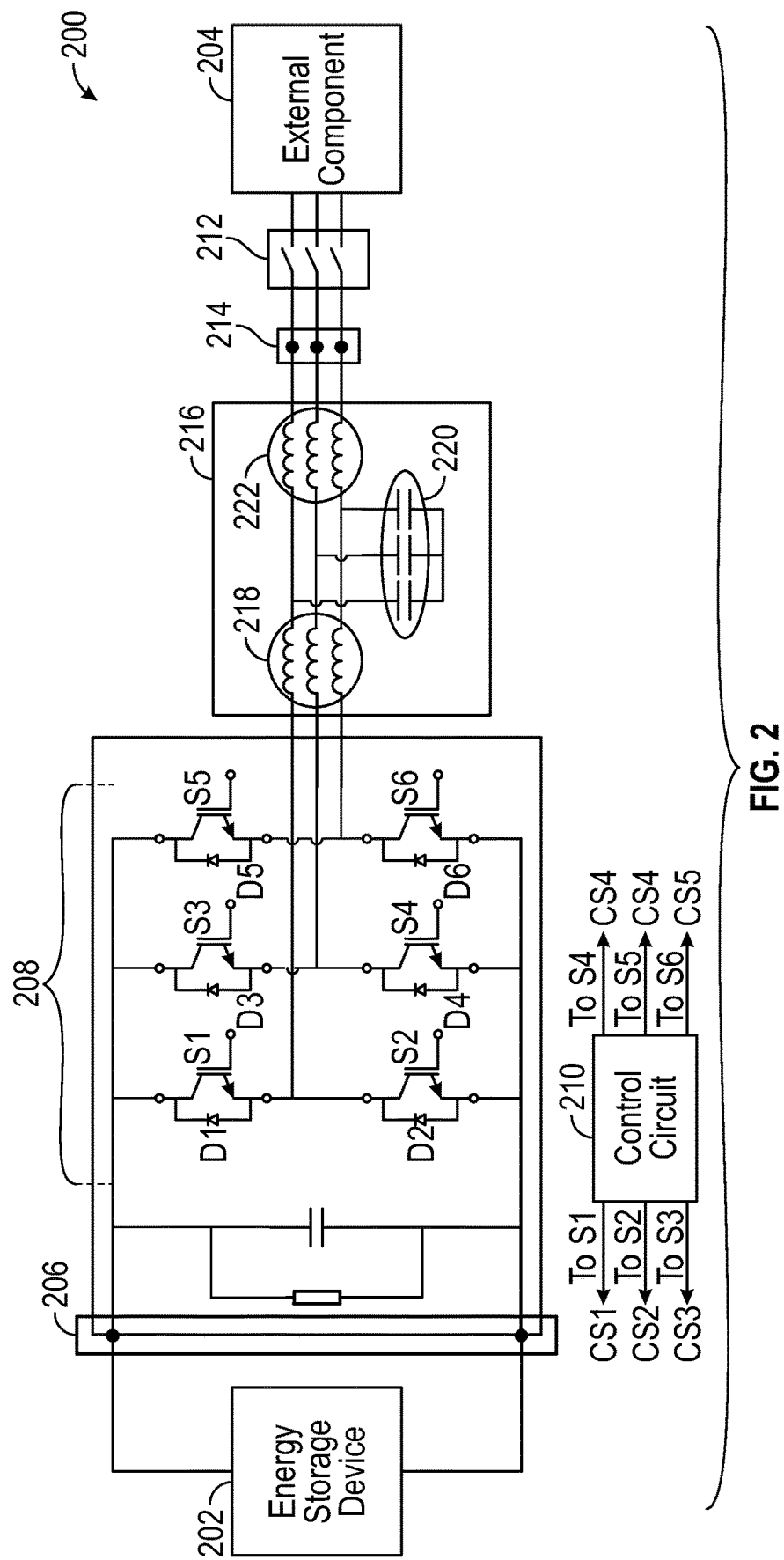
FIG. 2 is a schematic illustration of an example of a power conversion circuit configured to limit inrush current during startup without using resistors, in accordance with this disclosure.

FIG. 2 is a schematic illustration of an example of a power conversion circuit configured to limit inrush current during startup without using resistors, in accordance with this disclosure. In some examples, the power conversion circuit 200 of FIG. 2 can be used by the machine of FIG. 1.

The power conversion circuit 200 is coupled between an energy storage device 202, such as the DC power source (e.g., a battery module) of the electrical architecture 112 of the battery powered machine 100 of FIG. 1, and an external component 204, such as a grid (e.g., an electrical grid or a microgrid), motor, or generator.

The power conversion circuit 200 includes a first terminal 206 configured to couple to the energy storage device 202, and a converter circuit 208 coupled to the first terminal 206. The converter circuit 208 can be a bidirectional converter circuit that can convert DC to AC (converter) and AC to DC (inverter). The converter circuit 208 includes electronic switches, such as transistors, shown as electronic switches S1-S6, with corresponding protection diodes D1-D6 coupled across the electronic switch. A control circuit 210 is configured to generate control signals CS1-CS6 that are applied to corresponding electronic switches S1-S6, such as to the gates of transistors, to control the switching operation of the converter circuit 208.

The power conversion circuit 200 further includes a switch circuit 212, such as a circuit breaker, contactor, or the like, coupled to the external component 204, e.g., an AC voltage, and to a second terminal 214. The switch circuit 212 is configured to electrically disconnect the power conversion circuit 200 from the external component 204.

The power conversion circuit 200 includes a filter circuit 216 coupled between the converter circuit 208 and the second terminal 214 and configured to filter the AC voltage of the external component 204. The filter circuit 216 includes a first inductor 218 coupled to the converter circuit 208, a capacitor 220 coupled between the first inductor 218 and the second terminal 214, and a second inductor 222. In the example shown in FIG. 2, the second inductor 222 is coupled to the second terminal 214 and the first inductor 218 and the second inductor 222 are coupled in series.

Using the techniques of this disclosure, the second inductor 222 is a protection inductor that is configured to saturate at a current less than a current rating of at least one of the protection diodes D1-D6 to limit inrush current during startup without using resistors. For example, the protection inductor can be configured to saturate at a current between 1 time and 10 times, e.g., 5 times, that of a charging current of the capacitor 220 so as to prevent damage to the protection diodes D1-D6 without using resistors. By using the techniques of this disclosure, the control circuit 210 does not need to close any contacts, measure, and confirm voltages, and the like to pre-charge the capacitor 220, which thereby simplifies the control scheme and eliminates the amount of time needed to pre-charge the capacitor 220, e.g., 1 second to 5 minutes. Here, when the switch circuit 212 closes, the protection inductor, e.g., the second inductor 222, saturates and limits the inrush current without the use of pre-charge resistors.

In some examples, the protection inductors of this disclosure can include toroidal inductors. In other examples, the protection inductors of this disclosure can include silicon steel inductors or IE inductors. In some examples, the first inductor 218 includes a toroidal inductor, a silicon steel inductor, or an IE inductor.

In some examples, the power conversion circuit 200 is a 3-phase converter circuit, such as shown in FIG. 2. In some such examples, the protection inductor includes a 3-phase inductor, such as a 3-phase toroidal inductor, and the first inductor includes a 3-phase inductor. In other examples, the power conversion circuit 200 can be a single-phase converter circuit with a single-phase protection inductor.

Figure 3:
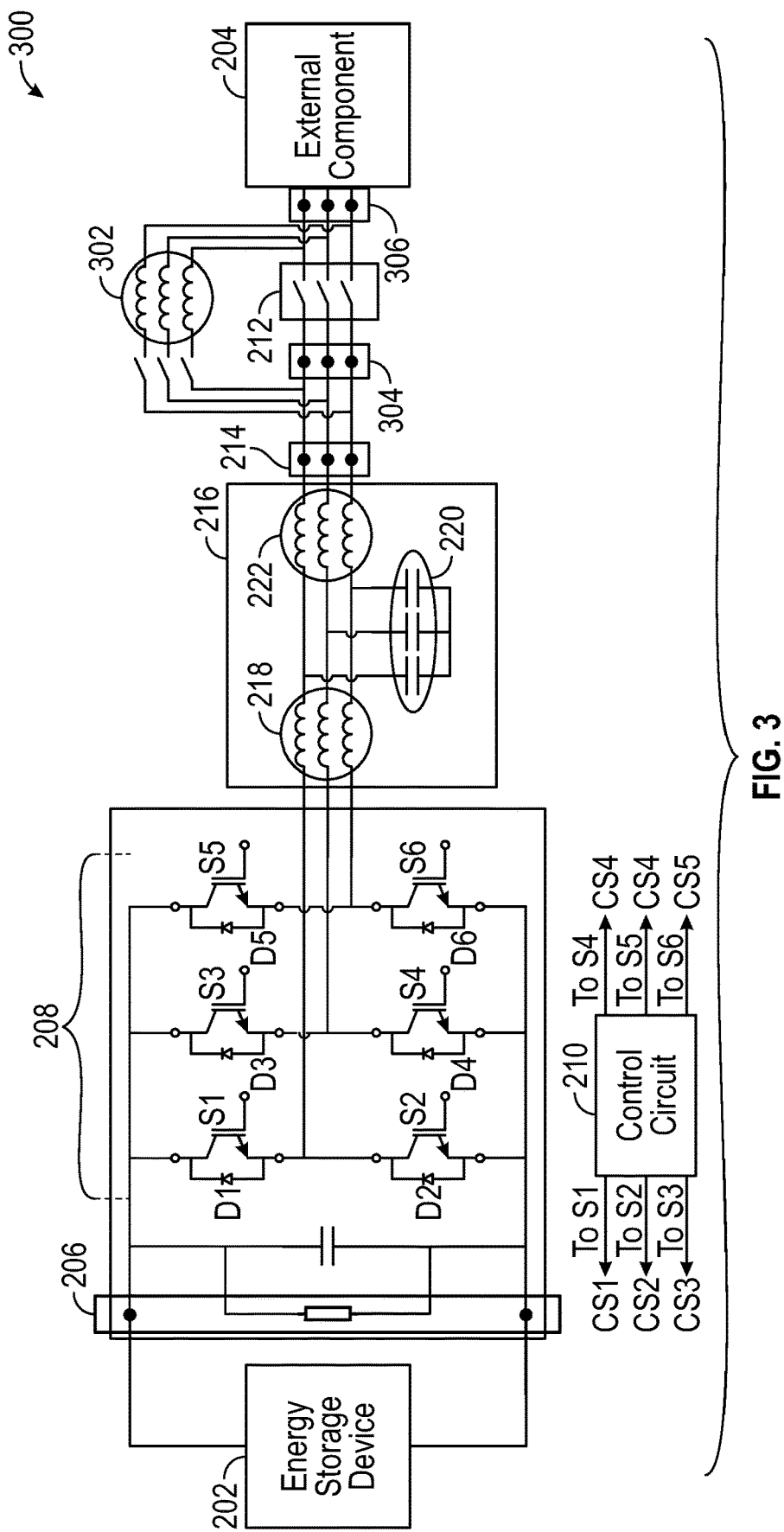
FIG. 3 is a schematic illustration of another example of a power conversion circuit configured to limit inrush current during startup without using resistors, in accordance with this disclosure.

FIG. 3 is a schematic illustration of another example of a power conversion circuit configured to limit inrush current during startup without using resistors, in accordance with this disclosure. In some examples, the power conversion circuit 300 of FIG. 3 can be used by the machine of FIG. 1. Some of the components of the power conversion circuit 300 are similar to those of the power conversion circuit 200 of FIG. 2 and, as such, use similar reference numbers. For brevity, similar components will not be described in detail again.

The power conversion circuit 300 of FIG. 3 further includes a third inductor 302 coupled to the second terminal 214. In addition, the third inductor 302 is coupled between an input terminal 304 and an output terminal 306 of the switch circuit 212. In the power conversion circuit 300, the third inductor 302 is a protection inductor that is configured to saturate at a current less than a current rating of at least one of the protection diodes D1-D6 to limit inrush current during startup without using resistors. In such an example, the second inductor 222 need not be a protection inductor.

Figure 4:
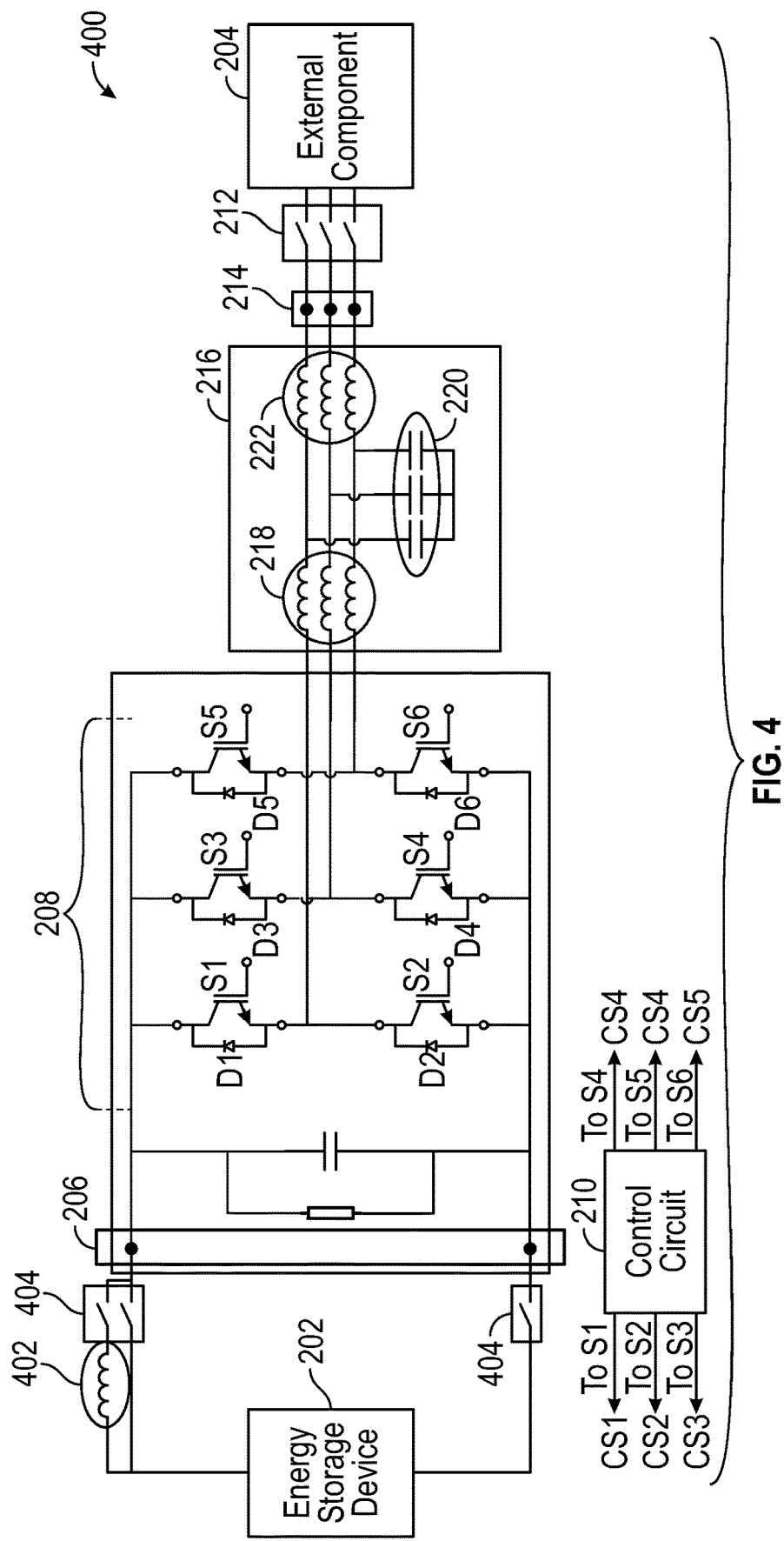
FIG. 4 is a schematic illustration of another example of a power conversion circuit configured to limit inrush current during startup without using resistors, in accordance with this disclosure.

FIG. 4 is a schematic illustration of another example of a power conversion circuit configured to limit inrush current during startup without using resistors, in accordance with this disclosure. In some examples, the power conversion circuit 400 of FIG. 4 can be used by the machine of FIG. 1. Some of the components of the power conversion circuit 400 are similar to those of the power conversion circuit 200 of FIG. 2 and, as such, use similar reference numbers. For brevity, similar components will not be described in detail again.

The power conversion circuit 400 of FIG. 4 further includes a third inductor 402 coupled to the first terminal 206, where the third inductor 402 is the protection inductor. In some examples, such as shown in FIG. 4, the power conversion circuit 400 includes another switch circuit 404 coupled between the energy storage device 202 and the first terminal 206. In some such configurations, the third inductor 402 is coupled to 1) the first terminal 206 through the switch circuit 404 and 2) the energy storage device 202. In such an example, the second inductor 222 need not be a protection inductor.

Figure 5:
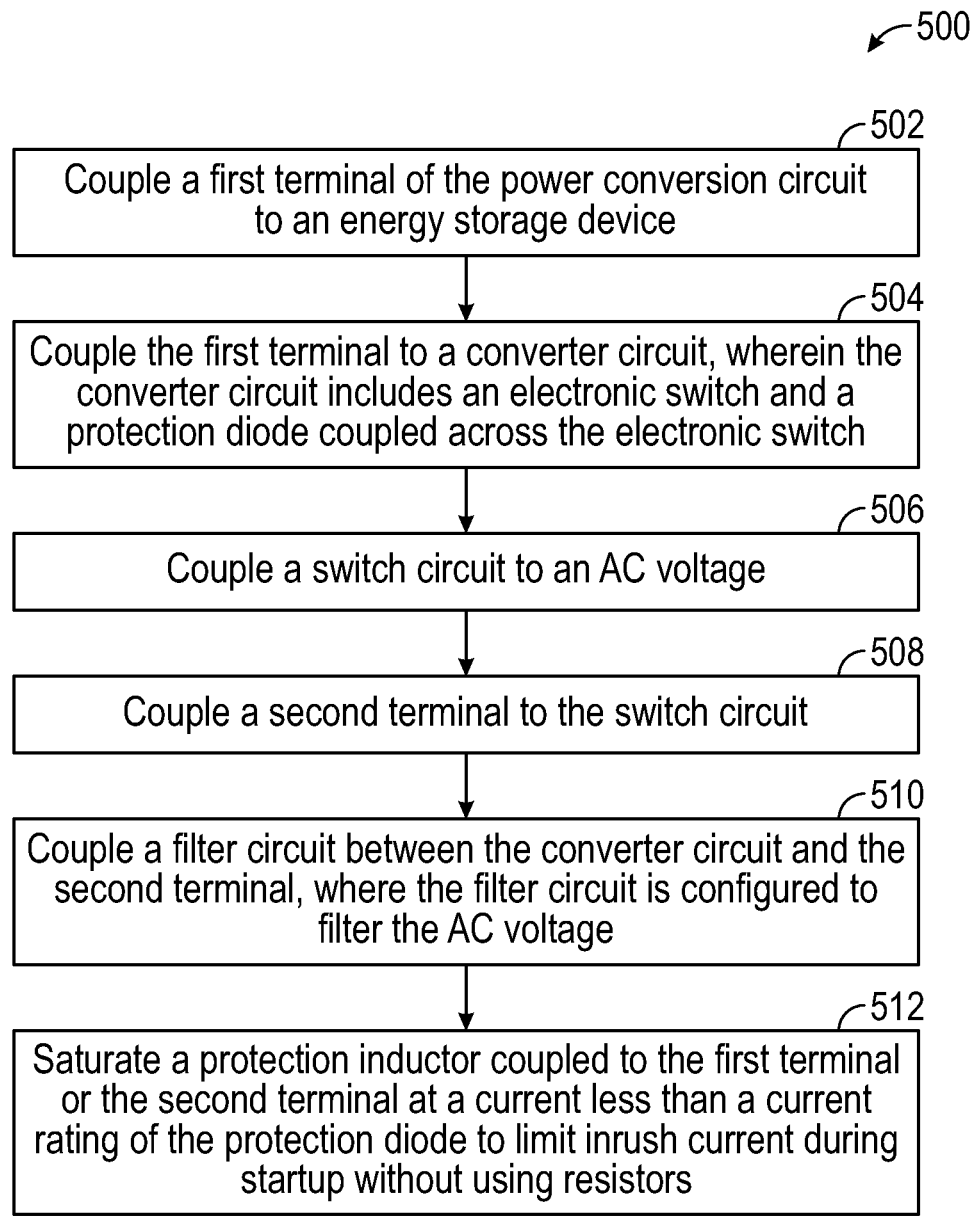
FIG. 5 is a flow diagram of an example of a method 500 of limiting inrush current to a power conversion circuit during startup without using resistors.

FIG. 5 is a flow diagram of an example of a method 500 of limiting inrush current to a power conversion circuit during startup without using resistors. At block 502, the method 500 includes coupling a first terminal of the power conversion circuit to an energy storage device. For example, the first terminal 206 can be coupled to the energy storage device 202 of FIG. 2.

At block 504, the method 500 includes coupling the first terminal to a converter circuit, wherein the converter circuit includes an electronic switch and a protection diode coupled across the electronic switch. For example, the first terminal 206 can be coupled to the converter circuit 208 of FIG. 2.

At block 506, the method 500 includes coupling a switch circuit to an AC voltage. For example, the switch circuit 212 can be coupled to the external component 204 of FIG. 2, such as an electrical grid, microgrid, motor, or generator.

At block 508, the method 500 includes coupling a second terminal to the switch circuit. For example, the second terminal 214 can be coupled to the switch circuit 212 of FIG. 2.

At block 510, the method 500 includes coupling a filter circuit between the converter circuit and the second terminal, wherein the filter circuit is configured to filter the AC voltage. For example, the filter circuit 216 can be coupled between the converter circuit 208 and the second terminal 214 of FIG. 2.

At block 512, the method 500 includes saturating a protection inductor coupled to the first terminal or the second terminal at a current less than a current rating of the protection diode to limit inrush current during startup without using resistors. For example, the second inductor 222 of FIG. 2 can be coupled to the second terminal 214 and be the protection inductor. In another example, the third inductor 302 of FIG. 3 can be coupled to the second terminal 214 and be the protection inductor. In yet another example, the third inductor 402 of FIG. 4 can be coupled to the first terminal 206 and be the protection inductor.

INDUSTRIAL APPLICABILITY

Conventional approaches to solve the inrush current issue in DC/AC, DC/DC or AC/DC converters involve placing a pre-charge resistor in the current path to reduce the magnitude. However, the pre-charge resistor introduces a lossy element that consumes power during normal operation.

Techniques of this disclosure advantageously eliminate the need for a dedicated pre-charge resistor by using the main power path of the AC/DC, DC/DC, or DC/AC converter. By eliminating the pre-charge resistor, the techniques increase the maximum allowable current rating of the converter as well as increase the impedance and inductance of the converter.

Unless explicitly excluded, the use of the singular to describe a component, structure, or operation does not exclude the use of plural such components, structures, or operations or their equivalents. The use of the terms "a" and "an" and "the" and "at least one" or the term "one or more," and similar referents in the context of describing the invention (especially in the context of the following claims) are to be construed to cover both the singular and the plural, unless otherwise indicated herein or clearly contradicted by context. The use of the term "at least one" followed by a list of one or more items (for example, "at least one of A and B" or one or more of A and B") is to be construed to mean one item selected from the listed items (A or B) or any combination of two or more of the listed items (A and B; A, A and B; A, B and B), unless otherwise indicated herein or clearly contradicted by context. Similarly, as used herein, the word "or" refers to any possible permutation of a set of items. For example, the phrase "A, B, or C" refers to at least one of A, B, C, or any combination thereof, such as any of: A; B; C; A and B; A and C; B and C; A, B, and C; or multiple of any item such as A and A; B, B, and C; A, A, B, C, and C; etc.

The above detailed description is intended to be illustrative, and not restrictive. The scope of the disclosure should, therefore, be determined with references to the appended claims, along with the full scope of equivalents to which such claims are entitled.

What is claimed is:

1. A power conversion circuit configured to limit inrush current during startup without using resistors, the power conversion circuit comprising:
    a first terminal configured to couple to an energy storage device;
    a converter circuit coupled to the first terminal, the converter circuit including an electronic switch and a protection diode coupled across the electronic switch;
    a switch circuit configured to couple to an AC voltage;
    a second terminal coupled to the switch circuit;
    a filter circuit coupled between the converter circuit and the second terminal and configured to filter the AC voltage, the filter circuit including:
        a first inductor coupled to the converter circuit; and
        a capacitor coupled between the first inductor and the second terminal; and
    a protection inductor coupled to the first terminal or the second terminal, wherein the protection inductor does not include a transformer, wherein the protection inductor is configured to limit inrush current during startup without using resistors, and wherein the protection inductor is configured to saturate at a current less than a current rating of the protection diode.

2. The power conversion circuit of claim 1, wherein the protection inductor is coupled to the second terminal, and wherein the filter circuit further comprises:
    a second inductor coupled between the capacitor and the second terminal, wherein the first inductor and the second inductor are coupled in series.

3. The power conversion circuit of claim 2, wherein the protection inductor is further coupled between an input terminal and an output terminal of the switch circuit.

4. The power conversion circuit of claim 1, wherein the protection inductor is coupled to the second terminal, and wherein the filter circuit further comprises:
    a second inductor coupled in series with the first inductor, and wherein the second inductor includes the protection inductor.

5. The power conversion circuit of claim 1, wherein the protection inductor includes a toroidal inductor.

6. The power conversion circuit of claim 1, wherein the protection inductor is coupled to the second terminal, and wherein the first inductor includes a toroidal inductor.

7. The power conversion circuit of claim 1, wherein the converter circuit is a 3-phase converter circuit.

8. The power conversion circuit of claim 1, wherein the protection inductor includes a 3-phase toroidal inductor, and wherein the first inductor includes a 3-phase inductor.

9. The power conversion circuit of claim 1, wherein the switch circuit is a first switch circuit, the circuit further comprising:
a second switch circuit coupled between the energy storage device and the first terminal,
wherein the protection inductor is coupled to 1) the first terminal through the second switch circuit and 2) the energy storage device.

10. The power conversion circuit of claim 1, wherein the protection inductor is configured to saturate at a current between 1 time and 10 times that of a charging current of the capacitor.

11. A method of limiting inrush current to a power conversion circuit during startup without using resistors, the method comprising:
coupling a first terminal of the power conversion circuit to an energy storage device;
coupling the first terminal to a converter circuit, wherein the converter circuit includes an electronic switch and a protection diode coupled across the electronic switch;
coupling a switch circuit to an AC voltage;
coupling a second terminal to the switch circuit;
coupling a filter circuit between the converter circuit and the second terminal, wherein the filter circuit is configured to filter the AC voltage; and
saturating a protection inductor coupled to the first terminal or the second terminal at a current less than a current rating of the protection diode, wherein the protection inductor is configured to limit inrush current during startup without using resistors, and wherein the protection inductor does not include a transformer.

12. The method of claim 11, wherein the filter circuit includes a capacitor, a first inductor, and a second inductor, the method comprising:
coupling the protection inductor to the second terminal; and
coupling a second inductor between the capacitor and the second terminal, wherein the first inductor and the second inductor are coupled in series.

13. The method of claim 12, comprising:
coupling the protection inductor between an input terminal and an output terminal of the switch circuit.

14. The method of claim 11, wherein the filter circuit includes a capacitor, a first inductor, and a second inductor, the method comprising:
coupling the protection inductor to the second terminal; and
coupling a second inductor between the capacitor and the second terminal, wherein the first inductor and the second inductor are coupled in series, and wherein the second inductor includes the protection inductor.

15. The method of claim 11, wherein the protection inductor includes a toroidal inductor.

16. The method of claim 11, wherein the filter circuit includes a capacitor, a first inductor, and a second inductor, the method comprising:
coupling the protection inductor to the second terminal, and wherein the first inductor includes a toroidal inductor.

17. A power conversion circuit configured to limit inrush current during startup without using resistors, the power conversion circuit comprising:
a first terminal configured to couple to an energy storage device;
a converter circuit coupled to the first terminal, the converter circuit including an electronic switch and a protection diode coupled across the electronic switch;
a switch circuit configured to couple to an AC voltage;
a second terminal coupled to the switch circuit;
a filter circuit coupled between the converter circuit and the second terminal and configured to filter the AC voltage, the filter circuit including:
a first inductor coupled to the converter circuit; and
a capacitor coupled between the first inductor and the second terminal; and
a 3-phase protection inductor coupled to the second terminal, wherein the 3-phase protection inductor does not include a transformer, and wherein the 3-phase protection inductor is configured to limit inrush current during startup without using resistors, and wherein the 3-phase protection inductor is configured to saturate at a current less than a current rating of the protection diode.

18. The power conversion circuit of claim 17, wherein the 3-phase protection inductor is coupled to the second terminal, and wherein the filter circuit further comprises:
a second inductor coupled between the capacitor and the second terminal, wherein the first inductor and the second inductor are coupled in series.

19. The power conversion circuit of claim 18, wherein the 3-phase protection inductor is further coupled between an input terminal and an output terminal of the switch circuit.

20. The power conversion circuit of claim 18, wherein the 3-phase protection inductor is coupled to the second terminal, and wherein the filter circuit further comprises:
a second inductor coupled in series with the first inductor, and wherein the second inductor includes the 3-phase protection inductor.

* * * * *